United States Patent [19]
Mase et al.
[11] 3,927,815
[45] Dec. 23, 1975

[54] METHOD FOR PRODUCING MULTILAYER METALLIZED BERYLLIA CERAMICS

[75] Inventors: Shunzo Mase; Tetsuo Watanabe, both of Nagoya, Japan

[73] Assignee: NGK Insulators Ltd., Nagoya, Japan

[22] Filed: Mar. 24, 1975

[21] Appl. No.: 561,477

Related U.S. Application Data

[62] Division of Ser. No. 307,147, Nov. 16, 1972, Pat. No. 3,889,041.

[30] Foreign Application Priority Data

Nov. 22, 1971 Japan ................................ 46-92997

[52] U.S. Cl. .................................. 228/121; 228/122
[51] Int. Cl.$^2$ .......................................... B23K 31/02
[58] Field of Search ............ 228/121, 122; 427/376, 427/229, 404

[56] References Cited

UNITED STATES PATENTS

| | | | |
|---|---|---|---|
| 2,996,401 | 8/1961 | Welch et al. | 228/122 X |
| 3,520,054 | 7/1970 | Pensach et al. | 427/376 X |
| 3,635,759 | 1/1972 | Howatt | 427/376 X |
| 3,647,519 | 3/1972 | White | 427/404 X |

*Primary Examiner*—Al Lawrence Smith
*Assistant Examiner*—Margaret M. Joyce

[57] ABSTRACT

A multilayer metallized beryllia ceramics is prepared from unsintered beryllia green sheets and metallizing layers the metallizing layers made from a metallizing paste consisting of 60–97% by weight of at least one metal selected from the group consisting of molybdenum and tungsten, 1.5–39.6% by weight of beryllia and 0.03–20% by weight of at least one rare earth metal oxide selected from the group consisting of lanthanum oxide, yttria and praseodymium oxide, provided that the amount of the rare earth metal oxide being not more than the amount of beryllia, a matellizing layer being present between beryllia sheets. The ceramic is produced by applying a metallizing paste having the above described composition on a beryllia green sheet, laminating a plurality of beryllia green sheets applied with the metallizing paste and firing the laminated beryllia green sheets under a non-oxidizing atmosphere.

20 Claims, 3 Drawing Figures

METHOD FOR PRODUCING MULTILAYER METALLIZED BERYLLIA CERAMICS

This is a Divisional of application Ser. No. 307,147, filed Nov. 16, 1972, now U.S. Pat. No. 3,889,041.

BACKGROUND OF THE INVENTION

1. Field of the Invention

The present invention relates to multilayer ceramic body and particularly to a multilayer metallized beryllium oxide (beryllia) ceramics and a method for producing the same.

The terms "beryllia cermacis" and "beryllia green sheet" used herein mean materials in which not less than 85% by weight of the ceramic composition of the ceramic body and the green sheet consists of beryllia, respectively.

2. Description of the Prior Art

The multilayer metallized ceramics is used as packages for a large scale integration (LSI) or a transistor and the like and multilayer printed circuit substrate, etc. The multilayer metallized ceramics is produced by applying a metallizing paste consisting mainly of molybdenum (Mo) and/or tungsten (W) on a surface of a plurality of ceramic green sheets in a desired pattern, laminating these sheets and firing the resulting laminate into an integrate ceramic body and said multilayer metallized ceramics is particularly excellent in the mutual adhesion of ceramic sheets and have the same degree of strength as that of the ceramic body itself.

Beryllia ceramics is very high in the strength and thermal conductivity and has been interested and has a broad application but it has not been used as the multilayer metallized ceramics, because a metallizing paste having an excellent bonding ability which is the most important requirement for obtaining the multilayer metallized body has never been found for beryllia ceramics. Accordingly, as beryllia ceramics, only the product obtained by applying a metallizing paste on a surface of the sintered body without effecting lamination and firing the assembly has been used.

SUMMARY OF THE INVENTION

The object of the present invention is to provide a novel multilayer metallized beryllia ceramics by using a novel metallizing paste by which beryllia ceramics can be formed into a multilayer.

Another object of the present invention is to provide a method for producing multilayer metallized beryllia ceramics.

The foregoing objects and other objects as well as the characteristic features of the present invention will become more apparent and more readily understandable by the following description and the appended claims when read in conjunction with the accompanying drawings.

DETAILED DESCRIPTION OF THE INVENTION

Figure 1:
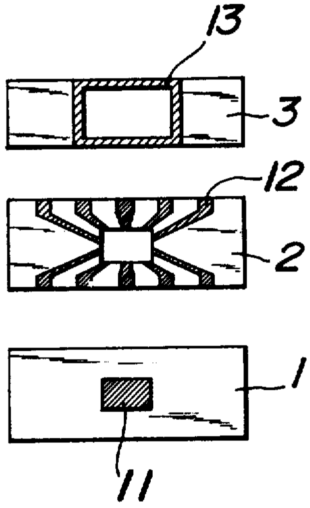
FIG. 1 shows a plan view of an embodiment for applying the metallizing paste on beryllia green sheets according to the present invention.

In the multilayer metallized beryllia ceramics, a part of a metallizing layer consisting of 60–97% by weight of at least one metal selected from the group consisting of molybdenum and tungsten, 1.5–39.6% by weight of beryllia, 0.03–20% by weight of at least one rare earth metal oxide selected from the group consisting of lanthanum oxide ($La_2O_3$), yttrium oxide ($Y_2O_3$, yttria) and praseodymium oxide $Pr_6O_{11}$), provided that the amount of the rare earth metal oxide being not more than the amount of beryllia, is present in the beryllia ceramics.

Furthermore, the metallizing layer may contain up to 20% by weight based on the total amount of metallizing layer of at least one oxide selected from the group consisting of silicon oxide ($SiO_2$, silica), aluminum oxide ($Al_2O_3$, alumina), magnesium oxide (MgO, magnesia), calcium oxide (CaO, calcia), boron oxide ($B_2O_3$), manganese dioxide ($MnO_2$) and zirconium oxide ($ZrO_2$, zirconia) in addition to the above described metals, beryllia and the rare earth metal oxide, but the amount of these oxides must be not more than the total amount of beryllia and the rare earth metal oxide.

The multilayer metallized beryllia ceramics according to the present invention may be produced by the following manner.

A metallizing composition consisting of 60–97% by weight of at least one metal selected from the group consisting of molybdenum and tungsten or said amount calculated as said metal, of at least one of compounds which can be converted into molybdenum or tungsten through firing, for example, molybdenum oxide and tungsten oxide, 1.5–39.6% of beryllia or said amount as calculated as beryllia, of at least one of compounds which can be converted into beryllia through firing, for example, beryllium hydroxide, beryllium sulfate, beryllium nitrate and beryllium carbonate, 0.03–20% weight of at least one rare earth metal oxide selected from the group consisting of lanthanum oxide, yttria and praseodymium oxide or said amount calculated as said oxide, of at least one of compounds which can be converted into said oxides through firing, for example, hydroxides, sulfates, nitrates, carbonates and oxalates of lanthanum, yttrium and praseodymium, provided that the amount of rare earth metal oxide being not more than the amount of beryllia, is mixed with a thermally volatile binder, such as nitrocellulose, methyl methacrylate resin and/or polyvinyl butyral resin, etc. and a solvent, such as toluene, ethanol and/or ethylacetate and the like to prepare a metallizing paste.

As mentioned above, the metallizing composition may contain up to 20% by weight based on the total amount of the metallizing composition of at least one oxide selected from the group consisting of silica, alumina, magnesia, calcia, boron oxide, manganese dioxide and zirconia or said amount calculated as these oxides, of at least one of compounds which can be converted into the above described oxides through firing, for example, ethylorthosilicate, aluminum hydroxide, aluminum silicate, aluminum sulfate, magnesium carbonate, magnesium chloride, magnesium hydroxide, magnesium sulfate, calcium carbonate, calcium chloride, calcium hydroxide, boric acid, manganese chloride, manganese sulfate, zircon, zirconium hydroxide and the like, but the amount of these oxides must be not more than the total amount of beryllia and the rare earth metal oxide.

On separately prepared dried beryllia green sheets is applied the above described metallizing paste in a desired pattern by a conventional process usually used in this technical field, for example, a screen printing and then a plurality of beryllia green sheets applied with the metallizing paste are laminated, after which the laminated sheets are fired under a non-oxidizing atmosphere, for example hydrogen, dissociated ammonia gas or vacuum, at a temperature of 1,400°–1,800°C, preferably 1,500°–1,700°C, whereby the multilayer metallized berllia ceramics can be obtained.

Alternatively, instead of laminating a plurality of dried beryllia green sheets applied with the metallizing paste, a beryllia ceramic slurry is applied on a beryllia green sheet applied with the metallizing paste and dried, thereafter the metallizing paste is applied thereon and in this manner the application of the beryllia ceramic slurry and the metallizing paste is repeated in a plurality of times.

Since the multilayer metallized beryllia ceramics according to the present invention contains beryllia and the rare earth metal oxide in the metallizing composition, the temperature range for starting the sintering and the firing shrinkage of the metallizing composition conform to those of the beryllia body and the breakage or disengagement of the metallizing layer does not occur. Consequently, the cohesion of the beryllia ceramics between which the metallizing layers are interposed, is very high.

On the other hand, when the metallizing composition containing either beryllia or the rare earth metal oxide or neither beryllia nor rare earth metal oxide is used, the temperature range for starting sintering and firing shrinkage of the metallizing composition are considerably different from those of the beryllia body and therefore the metallizing layer is broken or disengaged from the beryllia body during the firing and the adhesion is incomplete and the gastight adhesion which is the most important requirement for the multilayer metallized ceramics is lost.

The reasons why the multilayer metallized beryllia ceramics according to the present invention is excellent in the adhesive strength and the gastightness is based on the fact that the rare earth metal oxide in the metallizing composition is only slightly diffused into the not fully sintered beryllia ceramics, and beryllia and the rare earth metal oxide in the metallizing layer are reacted after the sintering of beryllia ceramics progresses, to fill the space between the metal particles and to react with the surface of the beryllia ceramics, whereby the strong adhesion is attained.

The above described amount of each component in the metallizing composition is defined based on the following reasons. When the amount of molybdenum and/or tungsten is less than 60% by weight, it is difficult to plate nickel and the other metal to the metallizing layer which is exposed on the outer surface of the beryllia ceramics and it is impossible to bond a lead wire to the metallizing layer by a silver solder or a soft solder, while when the amount exceeds 97% by weight, the prevention of disengagement and gastight adhesion with the beryllia ceramics can not be satisfactorily attained.

When the amount of beryllia is less than 1.5% by weight, the prevention of disengagement between the metallizing layer and the beryllia body is not attained satisfactorily, while when the amount exceeds 39.6% by weight, the amount of the rare earth metal oxide becomes insufficient.

When the amount of the rare earth metal oxide is less than 0.03% by weight, the reaction with beryllia does not occur satisfactorily and the adhesive strength is insufficient, while when the amount exceeds 20% by weight, the amount of beryllia becomes insufficient.

Furthermore, when the amount of the rare earth metal oxide exceeds the amount of beryllia, the prevention of disengagement and the gastight adhesion with the beryllia body can not be attained.

The following examples are given for the purpose of illustration of this invention and are not intended as limitations thereof.

EXAMPLES 1 to 11

Metallizing compositions as shown in Table 3, which is shown hereinafter, were mixed with the thermally volatile binder and solvent as shown in the following Table 1 to prepare the metallizing pastes.

Table 1

| | Parts by weight |
|---|---|
| Metallizing composition | 100 |
| Nitrocellulose | 10 |
| Toluene | 40 |
| Ethanol | 20 |
| Ethylacetate | 15 |

The mixture having the composition as shown in the following Table 2 was mixed in a ball mill to prepare the slurry for making beryllia green sheets.

Table 2

| | Parts by weight |
|---|---|
| Beryllia<br>(Purity: not less than 85%) | 100 |
| Polyvinyl butyral resin | 6 |
| Dibutyl phthalate | 2 |
| Toluene | 50 |
| Ethanol | 50 |

This slurry was poured on a glass sheet and made into an even layer having a thickness of about 2 mm by doctor-blading and then dried to form a beryllia green sheet.

From this sheet, the sheets 1, 2 and 3 as shown in FIG. 1, which constitute one group, were cut off in 15 groups and 15 discs having a diameter of 10 mm were cut off.

Figure 2:
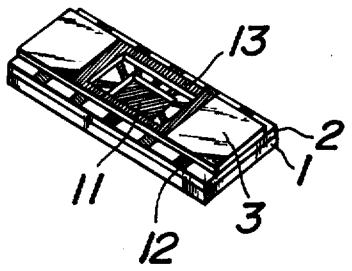
FIG. 2 shows a perspective view of the state before the laminated beryllia green sheets as shown in FIG. 1 are fired.

On the sheets 1, 2 and 3 in one group were printed the metallizing paste as shown in Table 1 containing the metallizing composition as shown in Table 3 by a screen printing into the patterns 11, 12 and 13 as shown in FIG. 1 and then the sheets 1, 2 and 3 were laminated as shown in FIG. 2 and the assembly was fired at the temperature as shown in Table 3 under hydrogen atmosphere. The remaining 14 groups of sheets were treated with the same manner as described above to prepare the samples of Examples 1 to 11 and Comparative Examples 1 to 4 in Table 3. The average thickness of the fired metallizing layers is about 20 microns.

As seen from Table 3, in the samples in Comparative Examples 1 to 4, either beryllia or the rare earth metal oxide or both beryllia and the rare earth metal oxide are not contained in the metallizing composition.

In Table 3, the appearance, the gastightness which is an indication of tight cohesion and is measured by means of helium leak detector and the peeling strength are shown.

Figure 3:
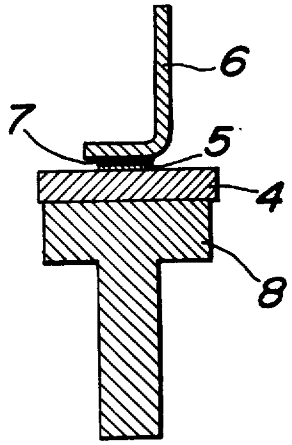
FIG. 3 is a view for explaining a method for measuring the peeling strength between the metallizing layer and the beryllia ceramics after firing.

The peeling strength was measured by the following manner. Each of the metallizing pastes having the compositions as shown in Table 3 was applied on the dried beryllia green disc 4 having a diameter of 10 mm prepared as described above and fired to form a metallizing layer 5 having a thickness of 20 microns and after nickel plating was made on the metallizing layer 5, a copper wire 6 having a diameter of 1 mm was bonded thereto by a silver solder (Ag-Cu eutectic) 7 as shown in FIG. 3 and then a jig 8 made by metal was adhered to the back face of the beryllia disc 4 by an epoxy resin, after which the copper wire 6 and the jig 8 were pulled to the opposite direction and the value when the metallizing layer 5 was separated from the beryllia disc 4, was determined.

As seen from the results in Table 3, in the multilayer metallized beryllia ceramics according to the present invention, the adhesion between the beryllia ceramics and the metallizing layer is strong and the gastightness is excellent.

from the group consisting of lanthanum oxide, yttria and praseodymium oxide and a thermally volatile binder, provided that the amount of the rare earth metal oxide being not more than the amount of beryllia, laminating these sheets and firing the laminated sheets under a non-oxidizing atmosphere.

2. A method as claimed in claim 1, wherein said firing is effected at a temperature of 1,400°-1,800°C.

3. A method as claimed in claim 2, wherein said temperature is 1,500°-1,700°C.

4. A method as claimed in claim 1, wherein said metal molybdenum and tungsten are used in the form of compounds capable of being converted into these metals through firing.

5. A method as claimed in claim 1, wherein said beryllia is used in the form of compounds capable of being converted into beryllia through firing.

6. A method as claimed in claim 1, wherein said rare earth metal oxides are used in the form of compounds capable of being converted into these rare earth metal oxides through firing.

7. A method for producing multilayer metallized beryllia ceramics which comprises applying on a plurality of beryllia green sheets a metallizing paste consist- Table 3

| No. | | Metallizing composition (% by weight) Mo | W | BeO | $La_2O_3$ | $Y_2O_3$ | $Pr_6O_{11}$ | $SiO_2$ | $Al_2O_3$ | MgO | CaO | $B_2O_3$ | $MnO_2$ | $ZrO_2$ |
|---|---|---|---|---|---|---|---|---|---|---|---|---|---|---|
| Example | 1 | 70 | — | 15 | — | 15 | — | — | — | — | — | — | — | — |
| | 2 | 95 | — | 3 | 2 | — | — | — | — | — | — | — | — | — |
| | 3 | — | 60 | 28 | — | — | 12 | — | — | — | — | — | — | — |
| | 4 | — | 80 | 15 | 3 | 2 | — | — | — | — | — | — | — | — |
| | 5 | 35 | 30 | 25 | — | 5 | 5 | — | — | — | — | — | — | — |
| | 6 | 45 | 40 | 12 | 1 | — | 2 | — | — | — | — | — | — | — |
| | 7 | 55 | 20 | 15 | 4 | 3 | 3 | — | — | — | — | — | — | — |
| | 8 | 70 | — | 15 | — | 5 | — | 3 | 5 | 1 | — | — | 1 | — |
| | 9 | — | 80 | 15 | — | 2 | — | 1 | 1 | 1 | — | — | — | — |
| | 10 | 55 | 20 | 15 | — | — | 3 | 2 | 2 | — | — | — | 1 | 2 |
| | 11 | 65 | — | 15 | — | 15 | — | 2 | — | — | 1 | 2 | — | — |
| Comparative Example | 1 | 100 | — | — | — | — | — | — | — | — | — | — | — | — |
| | 2 | — | 80 | — | — | — | — | 5 | 10 | 3 | — | — | 2 | — |
| | 3 | 45 | 40 | 15 | — | — | — | — | — | — | — | — | — | — |
| | 4 | 55 | 20 | — | 4 | 3 | — | 4 | 8 | 3 | — | 0 | 1 | 2 |

| No. | | Firing temperature (°C) | Appearance | Gastightness | Peeling strength (kg) |
|---|---|---|---|---|---|
| Example | 1 | 1,600 | | | 1.84 |
| | 2 | 1,450 | | | 1.69 |
| | 3 | 1,400 | | | 1.53 |
| | 4 | 1,550 | | | 1.80 |
| | 5 | 1,550 | | | 1.76 |
| | 6 | 1,450 | Good[1] | Good[3] | 2.10 |
| | 7 | 1,550 | | | 2.08 |
| | 8 | 1,650 | | | 1.73 |
| | 9 | 1,700 | | | 1.53 |
| | 10 | 1,550 | | | 1.81 |
| | 11 | 1,600 | | | 1.26 |
| Comparative Example | 1 | 1,600 | Metallizing layer was disengaged[2] | Bad[4] | Can not measured |
| | 2 | 1,700 | | | |
| | 3 | 1,600 | | | |
| | 4 | 1,500 | | | |

(1) The high adhesion between the beryllia body and the metallizing layer is recognized.
(2) The disengagement between the beryllia body and the metallizing layer is recognized.
(3) The helium leak rate under $10^{-5}$ mmHg is less than $10^{-10}$ $cm^3$/sec.
(4) The helium leak rate under $10^{-5}$ mmHg is more than $10^{-10}$ $cm^3$/sec.

What is claimed is:

1. A method for producing multilayer metallized beryllia ceramics which comprises applying on a plurality of beryllia green sheets a metallizing paste consisting of 60–97% by weight of at least one metal selected from the group consisting of molybdenum and tungsten, 1.5–39.6% by weight of beryllia and 0.03–20% by weight of at least one rare earth metal oxide selected ing of 60–97% by weight of at least one metal selected from the group consisting of molybdenum and tungsten, 1.5–39.6 % by weight of beryllia, 0.03–20% by weight of at least one rare earth metal oxide selected from the group consisting of lanthanum oxide, yttria and praseodymium oxide and up to 20% by weight of at least one oxide selected from the group consisting of silica, alumina, magnesia, calcia, boron oxide, manganese dioxide and zirconia and a thermally volatile binder, provided that the amount of the rare earth metal oxide being not more than the amount of beryllia and the amount of silica, alumina, magnesia, calcia, boron oxide, manganese dioxide and zirconia being not more than the total amount of beryllia and the rare earth metal oxide, laminating these sheets and firing the laminated sheets under a non-oxidizing atmosphere.

8. A method as claimed in claim 7, wherein said firing is effected at a temperature of 1,400°–1,800°C.

9. A method as claimed in claim 8, wherein said temperature is 1,500°–1,700°C.

10. A method as claimed in claim 7, wherein said metal molybdenum and tungsten are used in the form of compounds capable of being converted into these metals through firing.

11. A method as claimed in claim 7, wherein said beryllia is used in the form of compounds capable of being converted into beryllia through firing.

12. A method as claimed in claim 7, wherein said rare earth metal oxides are used in the form of compounds capable of being converted into these rare earth metal oxides through firing.

13. A method as claimed in claim 7, wherein said silica, alumina, magnesia, calcia, boron oxide, manganese dioxide and zirconia are used in the form of compounds capable of being converted into these oxides through firing.

14. A method for producing multilayer metallized beryllia ceramics which comprises applying on a beryllia green sheet a metallizing paste consisting of 60–97% by weight of at least one metal selected from the group consisting of molybdenum and tungsten, 1.5–39.6% by weight of beryllia and 0.03–20% by weight of at least one rare earth metal oxide selected from the group consisting of lanthanum oxide, yttria and praseodymium oxide and a thermally volatile binder, provided that the amount of the rare earth metal oxide being not more than the amount of beryllia, applying a beryllia ceramic slurry on the metallizing paste layer, drying the berryllia ceramic slurry and then applying the metallizing paste thereon, the application of the beryllia ceramic slurry and the metallizing paste being repeated in a plurality of times to form an assembly, and firing the assembly under a non-oxidizing atmosphere.

15. A method as claimed in claim 14, wherein said firing is effected at a temperature of 1,400°–1,800°C.

16. A method as claimed in claim 14, wherein said temperature is 1,500°–1,700°C.

17. A method for producing multilayer metallized beryllia ceramics which comprises applying on a beryllia green sheet a metallizing paste consisting of 60–97% by weight of at least one metal selected from the group consisting of molybdenum and tungsten, 1.5–39.6% by weight of beryllia, 0.03–20% by weight of at least one rare earth metal oxide selected from the group consisting of lanthanum oxide, yttria and praseodymium oxide and up to 20% by weight of at least one oxide selected from the group consisting of silica, alumina, magnesia, calcia, boron oxide, manganese dioxide and zirconia and a thermally volatile binder, provided that the amount of the rare earth metal oxide being not more than the amount of beryllia and the amount of silica, alumina, magnesia, calcia, boron oxide, manganese dioxide and zirconia being not more than the total amount of beryllia and the rare earth metal oxide, applying a beryllia ceramic slurry on the metallizing paste layer, drying the beryllia ceramic slurry and then applying the metallizing paste thereon, the application of the beryllia ceramic slurry and the metallizing paste being repeated in a plurality of times to form an assembly, and firing the assembly under a non-oxidizing atmosphere.

18. A method as claimed in claim 17, wherein said firing is effected at a temperature of 1,400°–1,800°C.

19. A method as claimed in claim 18, wherein said temperature is 1,500°–1,700°C.

20. A method as claimed in claim 17, wherein said silica, alumina, magnesia, calcia, boron oxide, manganese dioxide and zirconia are used in the form of compounds capable of being converted into these oxides through firing.

* * * * *